May 12, 1925.
G. GRAFFINBERGER
TRIMMER SAW MECHANISM
Original Filed Sept. 18, 1922   3 Sheets-Sheet 1
1,537,437
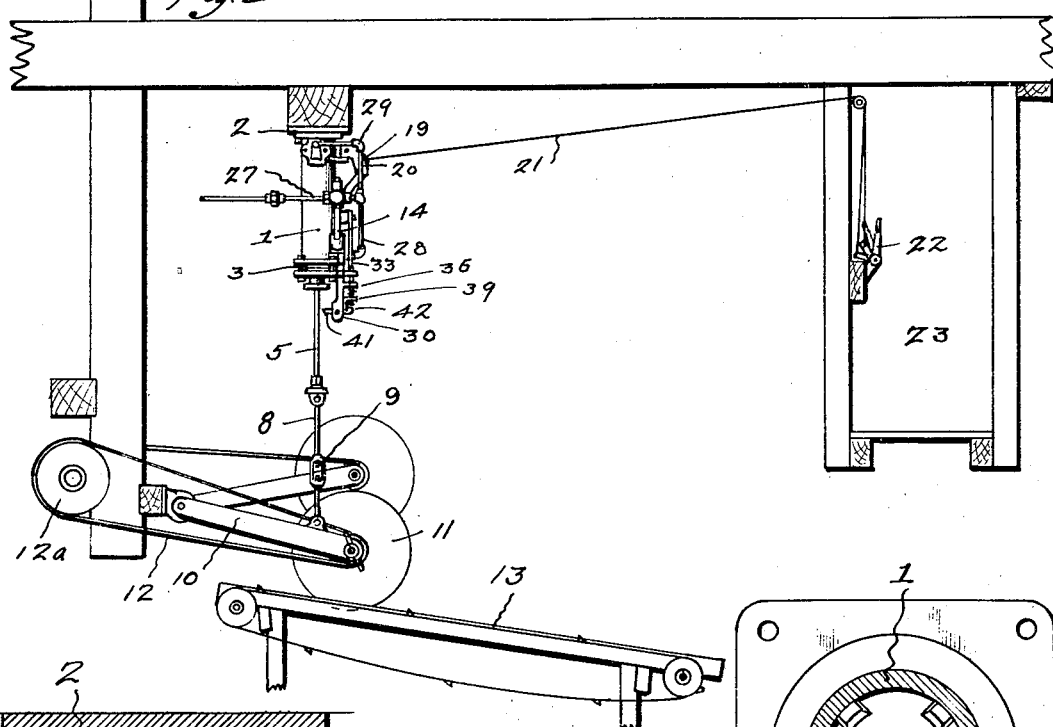
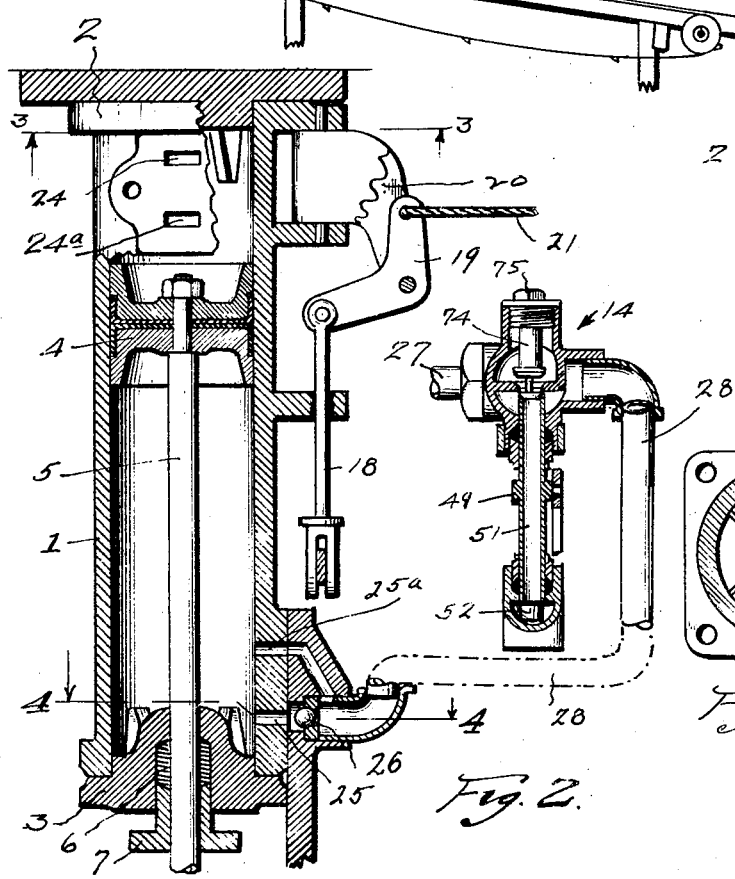
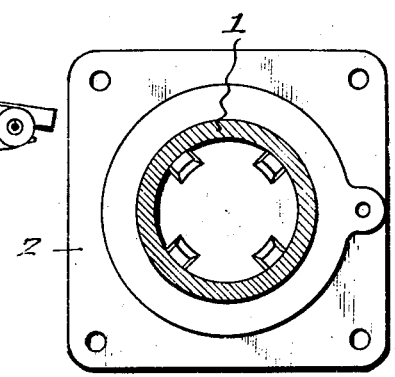
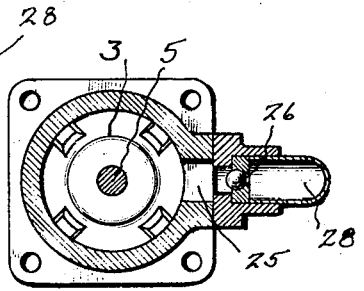
Inventor:
Gust Graffinberger
by          Atty May 12, 1925.  
G. GRAFFINBERGER  
TRIMMER SAW MECHANISM  
1,537,437  
Original Filed Sept. 18, 1922   3 Sheets-Sheet 2
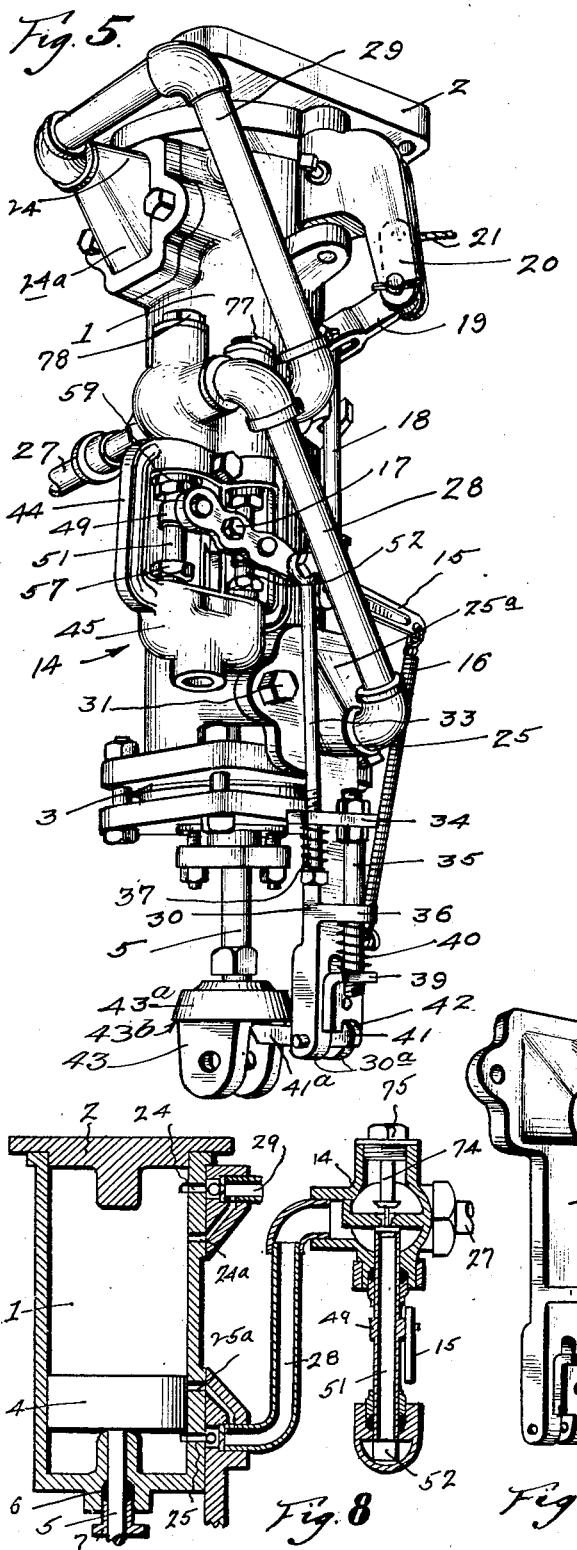
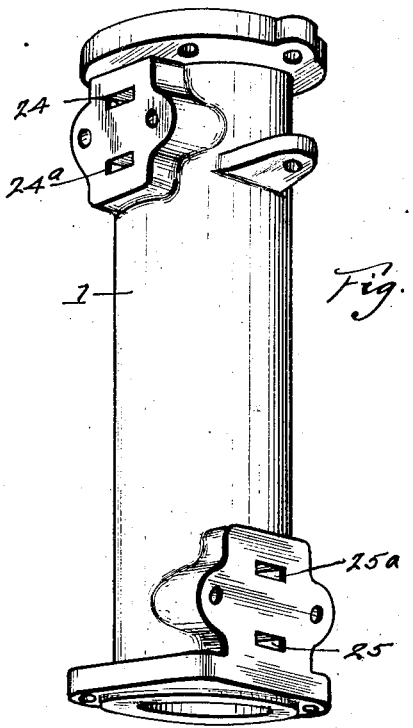
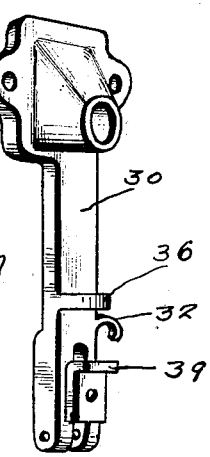
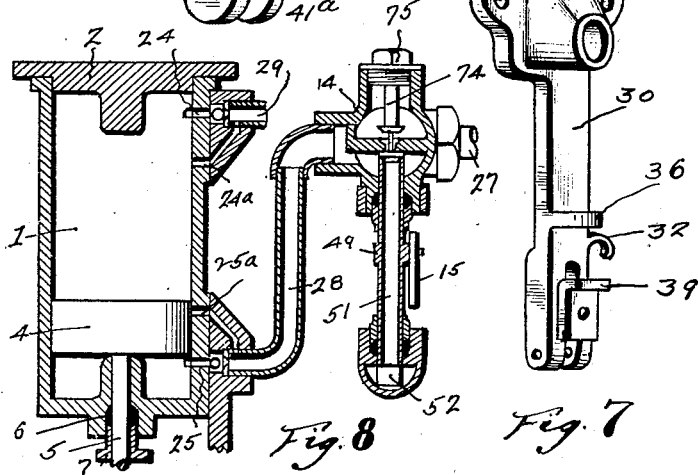
Inventor:
Gust Graffinberger May 12, 1925.  
G. GRAFFINBERGER  
TRIMMER SAW MECHANISM  
Original Filed Sept. 18, 1922  3 Sheets-Sheet 3  
1,537,437
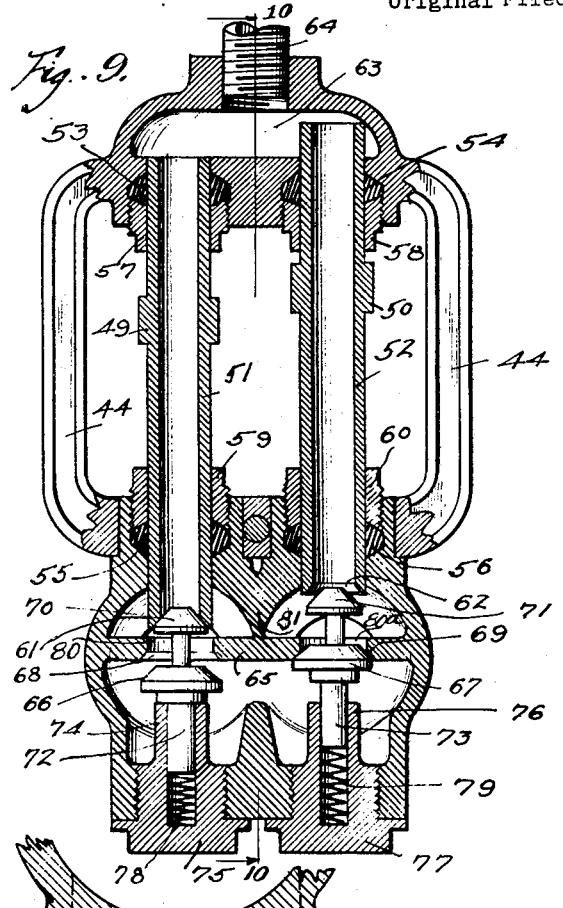
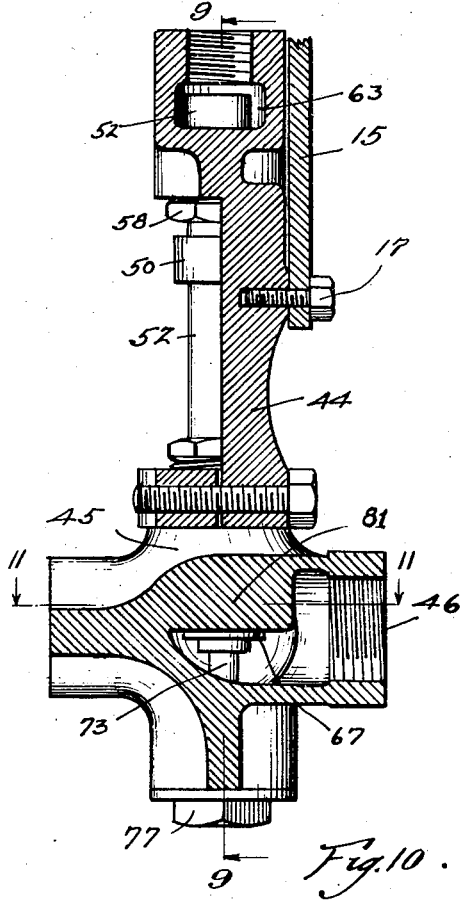
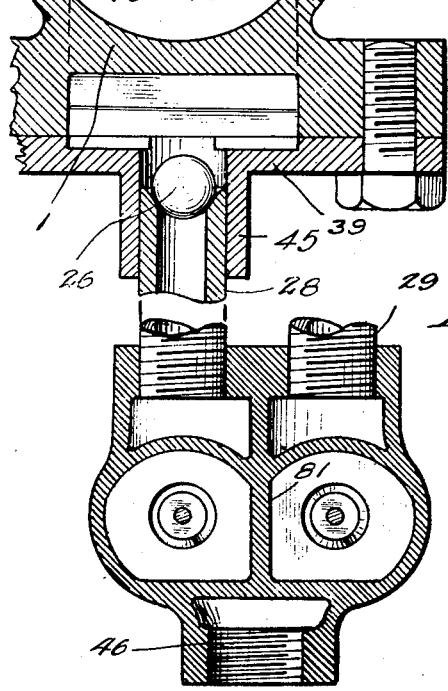
Inventor  
Gust Graffinberger  
by T.J.Geisler  
Atty.

Patented May 12, 1925.

1,537,437

UNITED STATES PATENT OFFICE.

GUST GRAFFINBERGER, OF PORTLAND, OREGON, ASSIGNOR TO METALLIC MANUFACTURING CO., OF PORTLAND, OREGON.

TRIMMER-SAW MECHANISM.

Original application filed September 18, 1922, Serial No. 588,964. Divided and this application filed February 1, 1923. Serial No. 616,322.

*To all whom it may concern:*

Be it known that I, GUST GRAFFINBERGER, a citizen of the United States, and a resident of Portland, county of Multnomah and State of Oregon, have invented a new and useful Improvement in Trimmer-Saw Mechanism, of which the following is a specification.

My invention relates to trimmer saw mechanism consisting of a gang of saws each connected to the piston of a power cylinder, so that these saws may be selectively thrown into and out of action by the operation of a master control; and the object of my invention is to provide positive means by which the selected saws are applied to, and withdrawn from, the work in an efficient manner.

Experience has taught that it is necessary that the saws selected from the gang of trimmer-saws be thrown into and out of action in unison; for, otherwise the lagging saw may fail in its work on the board to be trimmed, or mar and damage the succeeding board, or both.

The general practice is to throw these trimmer-saws into action selectively by the force of gravity, and to withdraw them from the work by means of a cylinder-and-piston element. But, since the speed at which the saw will drop obviously depends upon the degree of vacuum in the cylinder and the amount of friction in the mechanism, the selected saws frequently are not thrown into action in unison, even if the weights of the different saws are the same. And hence, if, for instance, the piston fits loosely in its cylinder the saw connected to such piston would drop abruptly, while if the piston in the companion saw fitted snug in its cylinder the drop of such saw would be materially slower.

In short, the working of the trimmer-saws constructed as mentioned is unreliable. It will not suffice that the saws be moved in one direction, for example from the work, with precision, by the employment of a controllable positive force, but the saws must be so moved in both directions, that is, both towards and from the work.

The specific object of my invention is, therefore, so to arrange the cylinder and piston elements by which the saws are thrown into and out of action, that the pistons to which the saws are connected will be moved in both directions with a positive controllable force.

My invention further has for its object the providing of a quick acting valve, in this that it shall provide an instantaneous release and escape for the fluid which has driven the piston in one direction, and in the same instance admit the fluid which shall drive the piston in the opposite direction.

I attain my object in the combination with the power cylinder of each saw, of a valve unit at each end of the cylinder for controlling the admission and emission of the operating fluid, and providing operating means connected to both valve units, adapted to work them oppositely to each other.

A further object of my invention is to provide means for latching the saw against dropping by its own weight, and to connect these means with said valve-operating means in such a way that the piston will be released from the latch simultaneously with the positioning of the valve to cause the outward stroke of the piston.

My invention further provides efficient means for cushioning the piston at each end of its stroke.

I prefer to use the valve heretofore invented by me and described in my application for Letters Patent of the United States filed Sept. 18, 1922, under Serial No. 588,964, of which application my present application for patent is a division.

The details which I prefer to use in carrying my invention into practice are hereinafter more fully described, reference being had to the accompanying drawings.

In such drawings:

Fig. 1 is a diagrammatic representation of a trimmer saw comprising a plurality of saws, each controlled by a power cylinder;

Fig. 2 is substantially a longitudinal section thru my improved cylinder and also shows the control valve in section;

Fig. 3 is a section taken on the line 3—3 of Fig. 2 and shows the construction of the base;

Fig. 4 is a section taken on the line 4—4 of Fig. 2; this section is taken thru the lower inlet port;

Fig. 5 is a perspective view of the assembled cylinder and its control mechanism;

Fig. 6 is a perspective view of a cylinder block with all of the control mechanism removed, shown inverted as hung from the ceiling;

Fig. 7 is a perspective view of the bracket by which the latching mechanism is attached to the power cylinder;

Fig. 8 is a diagrammatic view showing the relation between the double acting valve and the power cylinder.

Fig. 9 is a longitudinal section thru the double acting valve controlling the power cylinder taken on the line 9—9 of Fig. 10;

Fig. 10 is a section taken on the line 10—10 of Fig. 9; and

Fig. 11 is a section taken on the line 11—11 of Fig. 10 and shows a section thru one of the inlet ports of the cylinder with check valve in position.

My improved trimmer saw mechanism consists of a cylinder 1 which is closed at the ends by a base 2 and a head 3. The piston 4 works in the cylinder 1 and the piston rod 5 extends thru the head 3. The rod is packed as at 6 and the packing is held in place by the stuffing nut 7. The piston rod is connected to the connecting rod 8 which is adjusted as to length by means of the turn buckle 9. This rod 8 is pivotally connected to the arm 10 on which the trimmer saw is mounted. The saw 11 is driven by the belt 12 which is also mounted over the driving pulley 12$^a$. The piston, as it moves from end to end in the cylinder, lifts or lowers the arm 10 and thus moves the saw 11 towards or away from the trimmer table 13. The piston 4 is forced to either end of the cylinder by the action of steam or compressed air, the inflow and outflow of which is controlled by the valve 14. This double acting valve is controlled by the pivoted lever 15 which is normally held in one position by the spring 16. This lever is fulcrumed near one end as at 17 and is moved against the action of the spring 16 by the rod 18. This rod is connected to a bell crank 19 which is pivotally mounted in the swivel bracket 20. A wire 21 is fastened to the bell crank 19 and the other end of this wire is attached to one of the series of keys 22 in the operator's cage 23. Thus when the operator presses the key 22 it pulls the wire 21 and thus rotates the bell crank 19 in a clockwise direction as viewed in Fig. 2. This lifts the rod 18 and pulls the operating lever 15 against the action of the spring 16. Trimmer saws are arranged so that the saws are normally up and thus the valve 14 would be arranged so that the operating lever 15 in its normal position, would hold the valve so as to force steam under the cylinder thru the lower port. Thus when the key 22 is depressed it will cause steam to be admitted thru the upper inlet port 24 which is above the point of reciprocation of the piston, and this admitted steam will force the piston downward and thus lower the saw 11 into operative position. When the operator releases the key 22 the spring 16 will draw the lever 15 into its normal position. This will cause the valve to admit steam to the cylinder 1 thru the lower inlet port 25 and simultaneously will permit steam entrapped above the valve to be removed thru the upper outlet port 24$^a$. This will pull the saw 11 up into inoperative position in relation to the trimmer table 13. The upper and lower and outlet ports 24$^a$ and 25$^a$ for my improved cylinder, as shown in Fig. 2, provide a cushion at both ends of the cylinder. The operating fluid is permitted unobstructed passage into the lower end of the cylinder thru the inlet port 25 or the outlet port 25$^a$. As the piston approaches the lower end of the cylinder, as viewed in these figures, it covers the outlet port 25$^a$ and thus traps a portion of the operating fluid in said end. The operating fluid is prevented from passing out of the cylinder through the inlet port 25 because the check valve 26 engages its seat, as shown in Fig. 2. As shown in this figure, the lower outlet port 25$^a$ is spaced a substantial distance from the end of the cylinder so as to entrap a substantial quantity of operating fluid to provide a substantial cushion at said end. The similar inlet and outlet valves 24 and 24$^a$ at the upper end of the cylinder are arranged in a similar manner to provide a cushion at that end of said cylinder also. The operating fluid is received thru the supply pipe 27 which connects with the double acting valve 14. This valve distributes the operating steam either to the upper or the lower end of the piston as before described. The pipe 28 connects the valve and the lower ports 25 and 25$^a$ and the pipe 29 connects the upper ports 24 and 24$^a$.

An automatic locking device is provided for the cylinder which holds the piston in its uppermost position, even after the operating pressure is removed or substantially reduced. This automatic device consists of a bracket 30 which is fastened to the cylinder 1 by studs 31. This bracket preferably is made integral with the cap which covers the ports 25 and 25$^a$ as shown in Fig. 7. This bracket has a hook 32 to which the lower end of the spring 16 is attached.

A rod 33 is fastened to the operating lever 15 near its middle. This rod is fastened to an arm 34 which in turn is fastened to a sliding bolt 35 which is guided by an ear 36 on the bracket 30. When the lever 15 is depressed it forces the rod 33 downward and with it the arm 34 and the bolt 35. A coil spring 37 is mounted on the rod 33 between its head and the arm 34 so as to absorb any shock. The bottom 34 is fastened between two nuts 38 on the rod 35. This causes the arm 34 to be secured to the bolt 35 and to be slidably connected to the rod 33. The angle clip 39 is fastened to the end of the bolt 35 and a coil spring 40 is mounted on the bolt 35 and bears at each end against this angle clip and the ear 36, respectively.

A dog 41 is pivotally carried between the bifurcated portions 30$^a$ of the bracket 30. Said dog is pivoted relatively to its mass so that its free or engaging end 41$^a$ is slightly heavier than the portion that carries the projection 42, and thus tends to cause the latch to assume a position angular to a horizontal plane, as shown in Fig. 5. In one position of the angle clip 39 it engages the portion 42 of the dog so as to positively hold the same against rotation in one direction about the pivot. The position in which the dog is held is substantially horizontal, as shown in Fig. 5, so as to intersect the path of the coupling 43 which connects the piston 5 with the connecting rod 8. Said coupling is larger in diameter than said piston 5 and said connecting rod 8, and is substantially frusto-conical in shape. The upper and lower bases of said coupling are substantially parallel and the larger or under side 43$^b$ forms a shoulder which the dog 41 engages. The free or engaging end 41$^a$ of the dog 41 and the periphery 43$^a$ make substantially equal angles with the horizontal, relatively to each other, and thus permit the same to pass by each other in one direction even though the clip is held in engaging position. When said clip is out of engaging position the dog is free to rotate counter clock wise, as viewed in Fig. 5, so that the end 41$^a$ hangs downwardly at such an angle that the coupling 43 can pass by. The dog is prevented from moving further than to this degree by the projection 42 engaging the lower end of the angle clip 39. In other words, the limited travel of the angle clip 39 along the bracket 30 prevents the dog from rotating about its pivot except within certain degrees. In its greatest degree of rotation in a counter-clockwise direction, the dog is arranged so that the curved outer end of the projection 42 bears against the lowermost portion of the clip 39. When the latter is moved downwardly by the action of the lever 15, it presses against said curved portion and rotates said dog clock wise to substantially horizontal position in which position the clip passes behind the projection 42 to prevent the weight of the saw, the connecting rod and the other movable parts, from causing the dog to be rotated counter clock wise.

It is evident that the only way in which the dog can release the coupling is for some portion of said dog, bracket, or clip to break, and thus the holding device does not depend upon the tension of springs or the compressive action on the control mechanism as has been necessary in all similar devices of which I am aware.

To move said clip from behind said projection 42, the operating lever 15 is moved upwardly, as previously described, to change the position of the parts in the valve and this in turn lifts the rod 33 and with it the arm 34, rod 35 and angle clip 39. When said clip is lifted to a position higher than the top of the projection 42 the dog is permitted to fall and to release the coupling which would thus permit the saw to move into operative position.

The two-unit valve by which my cylinder is operated is one which controls the admission and emission of the operating fluid to both ends of the cylinder and is so constructed that when it admits steam to one end of the cylinder it will simultaneously permit the emission of steam from the opposite end. The valve mechanism is carried by a bracing frame 44, in which the valve body 45 is mounted. The operating fluid is transmitted thru a supply pipe 27 common to both units, said pipe connects with the inlet 46 at the bottom of the valve body 45. The valve is controlled as previously mentioned by the operating lever 15 which is pivoted as at 17. This lever is fastened to collars 49 and 50 which are secured to the discharge pipes 51 and 52. These discharge pipes are slidably mounted in the frame 44, thru the upper packing units 53 and 54 and thru the lower packing units 55 and 56. These packing units are held and compressed by the glands 57, 58, 59 and 60 respectively, thus providing a tight seal around the discharge pipe, allowing none of the operating fluid to be released from the main valve body.

This in one of the essential points in my invention, as heretofore valves which have attempted to perform similar functions to mine have leaked considerably and thus allowed the fluid to escape.

These discharge pipes have seats on their lower ends, seat 61 being on discharge pipe 51 and seat 62 on discharge pipe 52. The other end of these discharge pipes open to the exhaust chamber 63 on top of the valve which is connected with the exhaust pipe 64 which is connected with some suitable receiver. The valve body is provided with a horizontal dividing wall 65 against which the valve disks 66 and 67 seat. The valve disk 66 seats in seat 68 and the valve disk 67 in seat 69. The upper valve disk seats in the seat 61 in the discharge pipe 51 and the upper valve 71 seats in the valve seat 62 in the discharge pipe 52. The valve stem 72 connects the lower valve disc 66 and the upper valve disc 70, and the valve stem 73 connects the lower valve disc 67 and the upper valve disc 71. The valve stem 72 is guided by the extended wall 74 of the end nut 75. The valve stem 73 is guided by the extended wall 76 of the end nut 77. The coil spring 78 is positioned in the recess inside of the extended wall 74 and under the valve stem 72 and is adapted to force the valve stem upward and force the upper or lower valves against their respective seats. The spring 79 performs a similar function within the walls 76 and against the valve stem 73. These end nuts are provided in the valve so as to allow the valves to be removed and the valve seats to be reground and also to provide means for cleaning out any foreign material which gathers in the bottom of the valve.

It is to be noticed that the valve opening 46 connects with both sides of the valve but that the dividing horizontal wall 65 restrains the fluid from passing into the outlet pipes as shown in Fig. 11. The port 80 which is controlled by the valve disk 66 and the port 80ª which is controlled by the valve disk 69 are the openings provided to allow the pressure to pass thru the inlet pipe to the pipes 28 and 29. Above the dividing wall the ports are separated by the vertical dividing wall 81 so that the flow from one to the other is separate and independent.

The operation of the control mechanism for my trimmer saw is as follows:

As heretofore brought out, the double-acting valve shown, not only controls the admission of fluid to both ends of the cylinder, but also controls the emission of said actuating fluid therefrom. The parts of the valve are so connected that when the operating fluid is admitted to one end of the cylinder it is simultaneously emitted from the other end to permit the pressure of the actuating fluid in the first mentioned end to move the piston in the cylinder towards the latter mentioned end thereof. Thus when one of the keys 22 is depressed by the operator standing in the operator's cage, it tensions the flexible wire 21 and rotates the crank-lever 19 about its pivot to lift the rod 18 and therewith the operating lever 15 of the valve. This causes steam to be admitted in the upper end of the cylinder and to be emitted from the lower end, and thus the pressure of the actuating fluid admitted in the upper end of the cylinder forces the piston downwardly and moves the saw from inoperative position to operative position relatively to the feeding table 13 on which the boards to be trimmed are moving to the saws. The moving of the operating lever 15 lowers the discharge pipe 52 and raises the discharge pipe 51. This causes the seat on the lower end of the pipe 52 to engage its valve and to move the main valve from its seat to permit steam to enter the upper portion of the cylinder. The raising of the discharge pipe 51 permits the valve controlled thereby to seat on the port admitting the actuating fluid from the supply pipe and spaces the seat on its lower end from the valve to permit the steam contained within the cylinder to be emitted therefrom through the connecting pipe 28 to the discharge pipe. The movement of said lever also actuates the mechanical catch 41, as hereinbefore described. All of these actions are simultaneous and are accomplished by a single movement of one key by the operator.

I claim:

1. In combination with a series of trimmer saws, a fluid pressure cylinder for each saw in which the piston is cushioned at each end of its stroke by trapping the fluid pressure, and a valve control for each cylinder admitting and checking the admission of fluid at each end of its stroke, operable when desired to cause a single stroke in either direction.

2. In combination with a series of trimmer saws, a fluid pressure cylinder for each saw in which the fluid is admitted at each end, and a valve control for such cylinder admitting, emitting and checking the fluid at each end of its stroke, operable when desired to cause a single stroke in either direction.

GUST GRAFFINBERGER.